(12) United States Patent
Schubert

(10) Patent No.: US 7,143,658 B2
(45) Date of Patent: Dec. 5, 2006

(54) DEFLECTION PLATE WEIGHT SENSOR FOR VEHICLE SEAT

(75) Inventor: Peter J. Schubert, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 396 days.

(21) Appl. No.: 10/700,687

(22) Filed: Nov. 4, 2003

(65) Prior Publication Data

US 2005/0093277 A1    May 5, 2005

(51) Int. Cl.
*B60R 21/16* (2006.01)
*G01L 1/04* (2006.01)

(52) U.S. Cl. .......................... 73/862.632; 73/862.634; 73/862.639; 177/144; 177/211; 180/273; 280/735

(58) Field of Classification Search ........... 73/862.632, 73/862.634, 862.639; 177/211, 229, 136, 177/144; 180/273; 280/735
See application file for complete search history.

(56) References Cited

U.S. PATENT DOCUMENTS

| | | | |
|---|---|---|---|
| 3,609,624 A * | 9/1971 | Nagy ............................. | 338/2 |
| 4,423,640 A * | 1/1984 | Jetter .................... | 73/862.634 |
| 5,474,327 A | 12/1995 | Schousek .................... | 280/735 |
| 5,987,370 A | 11/1999 | Murphy et al. ............... | 701/45 |
| 6,069,325 A | 5/2000 | Aoki ........................... | 177/136 |
| 6,101,436 A | 8/2000 | Fortune et al. ............... | 701/45 |
| 6,323,444 B1 * | 11/2001 | Aoki ........................... | 177/144 |
| 6,448,512 B1 * | 9/2002 | Cooper ........................ | 177/144 |
| 6,494,482 B1 * | 12/2002 | Curtis ......................... | 280/735 |
| 6,634,235 B1 * | 10/2003 | Maeda et al. ................ | 73/781 |
| 6,677,539 B1 * | 1/2004 | Miura et al. ................ | 177/136 |
| 6,759,603 B1 * | 7/2004 | Curtis et al. ................ | 177/144 |

* cited by examiner

*Primary Examiner*—Randy W. Gibson
(74) *Attorney, Agent, or Firm*—Jimmy L. Funke

(57) ABSTRACT

The present invention involves a vehicle for passengers having a passenger safety system. The system has a crash sensor, a vehicle seat with a weight sensor assembly, an air bag and an air bag controller. The crash sensor is capable of providing a signal when the vehicle experiences an impact force of a predetermined magnitude. The vehicle seat is capable of supporting a vehicle occupant, with a seat frame member attached to a vehicle floor pan. The seat frame member has a rigid end and a resiliently flexible end, the resiliently flexible end able to resiliently deflect with respect to the vehicle floor pan upon experiencing a force due to the weight of the vehicle occupant. The sensor assembly has a cantilevered beam, a fulcrum, and a sensing device. The cantilevered beam has only one point of fixed attachment for connecting to the vehicle floor pan and the seat frame member, and is capable of resiliently deflecting upon experiencing a load force and capable of returning to its pre-load orientation after said load force is removed. The fulcrum is located beneath the free end of the cantilevered beam so as to prevent the beam from permanently deforming under extreme loading conditions. The sensing device is located beneath the cantilevered beam and is adapted to provide a signal when said beam is subjected to a load force of a predetermined magnitude. The airbag is suited to rapidly deploy and provide protection to the passengers when the vehicle experiences an impact force of a predetermined magnitude. The airbag controller is capable of interpreting signals from the crash sensor and sensing device to determine whether to deploy the airbag when the vehicle experiences an impact force of a predetermined magnitude.

15 Claims, 3 Drawing Sheets

DEFLECTION PLATE WEIGHT SENSOR FOR VEHICLE SEAT

TECHNICAL BACKGROUND

The invention relates to weight-sensing devices for passenger vehicles, and more particularly, to devices that can be installed in both new and existing vehicle seats so as to measure the weight of a seated passenger.

BACKGROUND OF THE INVENTION

As a result of recent federal legislation in the United States, automobile manufacturers are now required to provide a means for disabling certain passenger safety systems, such as airbags. This legislation generally pertains to protecting passengers, such as children and small adults, from an increased frequency of crash-related injuries resulting from airbag impacts. Thus, in general, there is a desire for such a system to be disabled according to a given passenger's weight; where there is a smaller weight, indicative of a child or small adult, the system must be disabled. Accordingly, numerous methods have been developed for measuring the weight of vehicle passengers, including, e.g., the placement of force-measuring apparatuses within the structural and padding elements of certain types of vehicle seats.

Correspondingly, various devices have been envisioned for sensing the weight of a passenger in a vehicle seat and thereby anticipating the size or stature of the seat's occupant. Such devices include the use of fluid-filled bladders under the foam seat cushion, arrays of force sensors under the seat fabric or strain-gage sensors at the connection points of the seat frame to the vehicle body.

In the case of fluid-filled bladders placed under the seat cushion, a disadvantage is that the system is subject to inaccuracy when an occupant's body weight is not distributed evenly on the seat cushion. In the inverse, the system is additionally susceptible to inaccuracy when an occupant's weight is focused at a point in proximity to the bladder's pressure sensing device. In either situation, the pressure sensing device may provide signals leading to erroneously low or high weight indications, respectively. Also, because bladder-based systems are integrated within the seat's padding, another disadvantage of such a system is that substantial modification of existing seats would likely be necessary so that the bladder and its components could be installed.

Similarly, devices that include the use of an array of force sensors mounted under the seat fabric, are also subject to erroneous readings due to unevenly distributed occupant weight. The array of seat force sensors does not account for occupant weight applied to the arm of the seat or the seat back. In addition, another disadvantage of a force sensor system stems from the requirement that the system's electronics must be capable of processing multiple sensor signals during calibration and use. As a result, manufacturers must design the system to have increased signal-processing power, and have the additional expense of arm and seat back force sensors to account for occupant weight applied to those areas. However, the electronics necessary to provide that processing power and account for the other locations also increase the cost substantially.

Vehicle seats and their frames are primarily designed to retain a seated and restrained passenger in the event the vehicle experiences a sudden impact. However, in order to accommodate a conventional weight-sensing system, the structural members associated with the vehicle seat frame must additionally be designed in light of the operational requirements of such a system. In some systems, the frame's structural members actually serve to connect the frame to the vehicle body and as semi-flexible beams on which force—or strain-measuring devices may be mounted. Such a system enables it to sense almost any normal force on the seat, regardless of pressure distribution. However, a common disadvantage of such a system is that as the strength and rigidity of the structural members increases, so too does the requisite level of sensor-sensitivity. Because sensors of higher sensitivity are more expensive to manufacture, systems that rely on them incur substantial cost. Moreover, another disadvantage is that such a system is sufficiently complicated that it could not likely be retrofitted into an existing seat.

Conventional weight-sensing systems have drawbacks for a variety of reasons, including the potential for inaccurate readings, additional complexity and expense of configuring the systems, and the difficulties associated with installing such systems into existing vehicles and seats.

What is needed in the art is a robust and relatively low-cost weight measuring system for vehicle seats that is easily retrofitted into existing vehicles.

SUMMARY OF THE INVENTION

The present invention is a cost-efficient weight measuring sensor assembly that is simple to manufacture and can be mounted in new or existing vehicle seats. The assembly is used in concert with a vehicle's crash detection mechanism and an airbag controller to determine the circumstances under which an airbag should be deployed. The assembly may also be used to provide a passenger's weight to a wide variety of other vehicular control systems.

The weight measuring sensor assembly of the present invention comprises a plate member, a sensing device and a fulcrum. The present invention is designed so that the sensitivity of the sensor may be adjusted in correspondence with increases in strength and rigidity of the structural members that comprise the seat frame or link it to the vehicle floor pan. For the present invention to operate successfully, the sensing device merely need be located proximate to the attachment of the seat frame and the vehicle body, potentially one sensing device proximate each of the four corners of a conventional seat frame.

The present invention involves an assembly for measuring the weight of a seated vehicle occupant and providing an associated signal. The assembly is based around a deflectable plate member of a sufficiently low profile that it may be placed proximate the seat frame without being detected by a vehicle occupant. Alternately, the plate member may, be integrated onto the underside of the seat frame. In an exemplary embodiment, one end of the plate member is attached to the uppermost and forward portion of the seat frame, where the frame is approximately horizontal. The other end of the plate member is associated with the load and elevated slightly above the attached end. Thus, the plate member is essentially a cantilevered beam, fixed at only one end. So that it may be secured, the plate member includes means to accept a fastener, such as a hole or slot. The plate member may also include one or more indentations. One such indentation could accept a sensing device, such as a strain gauge. The plate member is typically a stamped structure manufactured from a steel alloy other rigid metal.

The fastener used to secure the plate member to the seat frame could be a pin, a rivet, a tab, or a threaded fastener. Such fasteners are usually manufactured from a rigid metal. Alternately, the plate member could be welded to the seat frame. A weld would be advantageous in situations where it would not be desirable to disturb the frame's mounting hardware, such as in cases where the weight sensing assembly was retrofitted onto an existing vehicle seat. The present invention is advantageous in that it only requires a single point of attachment, thereby making it simple to install.

The fulcrum of the present invention is used to elevate the non-fixed end of the plate member above the upper surface of the floor pan. The fulcrum is positioned at or near the point most distant from the plate member's connection to the seat frame. In this way, the elevated end of the plate member will generally deflect in proportion to the downward forces that it experiences without undergoing a permanent deformation. The placement of the fulcrum also biases the deflection of the plate member such that the deflection is concentrated between the fulcrum and point at which the plate member is attached to the seat frame. The fulcrum may be an integral part of the plate member, such as a stamped feature thereon, or it may be added to the upper surface of the seat frame. In general the fulcrum will be manufactured of a sufficiently hard material that it will withstand the high forces of installing the fastener or weld, and sufficiently robust that it will survive for the lifetime of the vehicle. While a metal fulcrum structure is simple and convenient, other materials, such as hard rubbers or certain structural plastics and composites, may be used instead.

The sensing device is mounted on the underside of the plate member, between the fulcrum and the plate member's point of attachment with the seat frame. The sensing device may be a strain gauge or other suitable force or pressure measuring device. The sensing device may be mounted to the surface of the plate member with an adhesive or other, similar fastening method. Alternately, the sensing device may be adhesively mounted within an indentation on the plate member. In either mounting scenario, the selected sensing device is disposed so as to provide a signal when the plate member deflects under a predetermined load.

As a result of being independent of the other structural members that connect the seat to the vehicle floor pan, the rigidity of sensing device may be easily accommodated according to the device's sensitivity to force loads. Moreover, as neither the strength nor rigidity of the plate member is required to be sufficient to retain the seat in the event that the vehicle were to crash, the plate member may be advantageously designed so as to maximize the sensing accuracy of an inexpensive sensing device. Further, as the plate member can be relatively thin, and also uncomplicated in terms of design features, the present invention provides a low-cost means to measure occupant weight in new or existing vehicle seats.

While many different embodiments of the present invention are conceivable, a common feature is that upon attachment of the plate member to the seat frame, the sensing device will sense an initial "baseline" force and provide an associated signal. As the plate member experiences a force load due to the weight of an occupant, the force sensed by the sensing device may increase above or decrease below the baseline force. The baseline force may be detected upon installation and calibrated out so as not to be a direct factor in calculating the occupant's weight. Alternately, the occupant's weight may be calculated using the absolute value of the difference between the baseline force and the force introduced to the system by the addition of the occupant's weight.

BRIEF DESCRIPTION OF THE DRAWINGS

The aforementioned and other features and objects of this invention, and the manner of attaining them, will become apparent and the invention itself will be better understood by reference to the following description of several embodiments of the invention taken in conjunction with the accompanying drawings, wherein.

Figure 1:
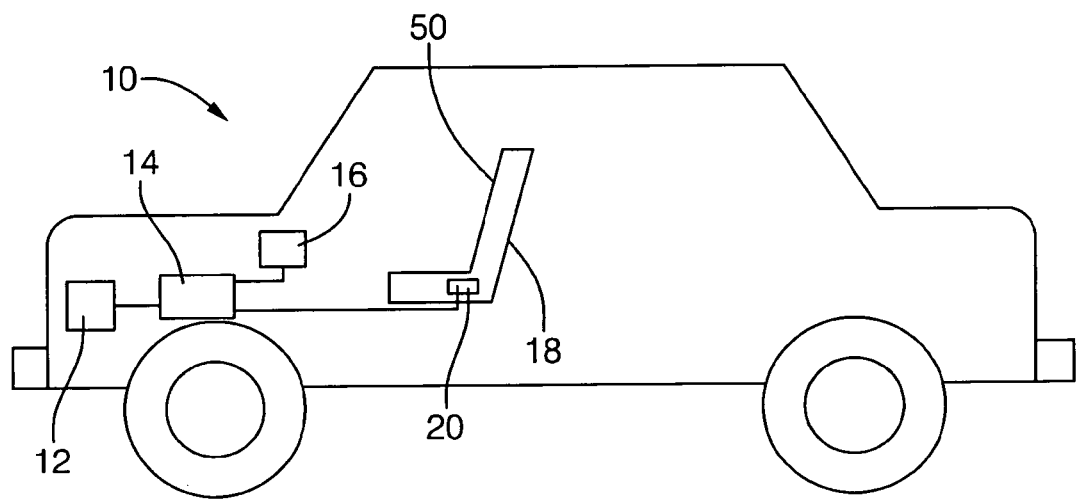
FIG. 1 is a schematic diagram of a vehicle including a weight sensor for vehicle seat device.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DETAILED DESCRIPTION OF THE PRESENT INVENTION

The embodiments disclosed below are not intended to be exhaustive or to limit the invention to the precise form disclosed in the detailed description. Rather, the embodiments are chosen and described so that others skilled in the art might utilize their teachings.

The simple weight sensor for a vehicle seat of the present invention is shown in FIG. 1 as vehicle 10 containing crash or collision sensor 12, vehicle or a car seat 18, and weight sensor 20. Weight sensor 20 is coupled to control unit 14, which is in turn coupled to collision or crash sensor 12 and air bag 16. Control unit 14 receives a weight indication signal from sensor 20 to determine the weight of the occupant of car seat 18 and appropriately operate air bag 16 in reaction to signals from crash sensor 12. In addition, other vehicle sensors and other operational units may be coupled to control unit 14 and weight sensor 20 disclosed in this exemplary embodiment. For example, multiple weight sensors 20 may be deployed at different positions relative to seat 18 to determine the proximity of the vehicle occupant to air bag 16 to control or disable air bag 16 depending on the sensed position of the occupant of vehicle seat 18. Control unit 14 may also use other sensors, for example position sensors or remote sensors (not shown) distributed throughout vehicle 10 for enabling or disabling airbag 16 or other devices (not shown), such as side air bags or other safety or driving devices, depending on the values received from the various possible inputs.

Figure 2:
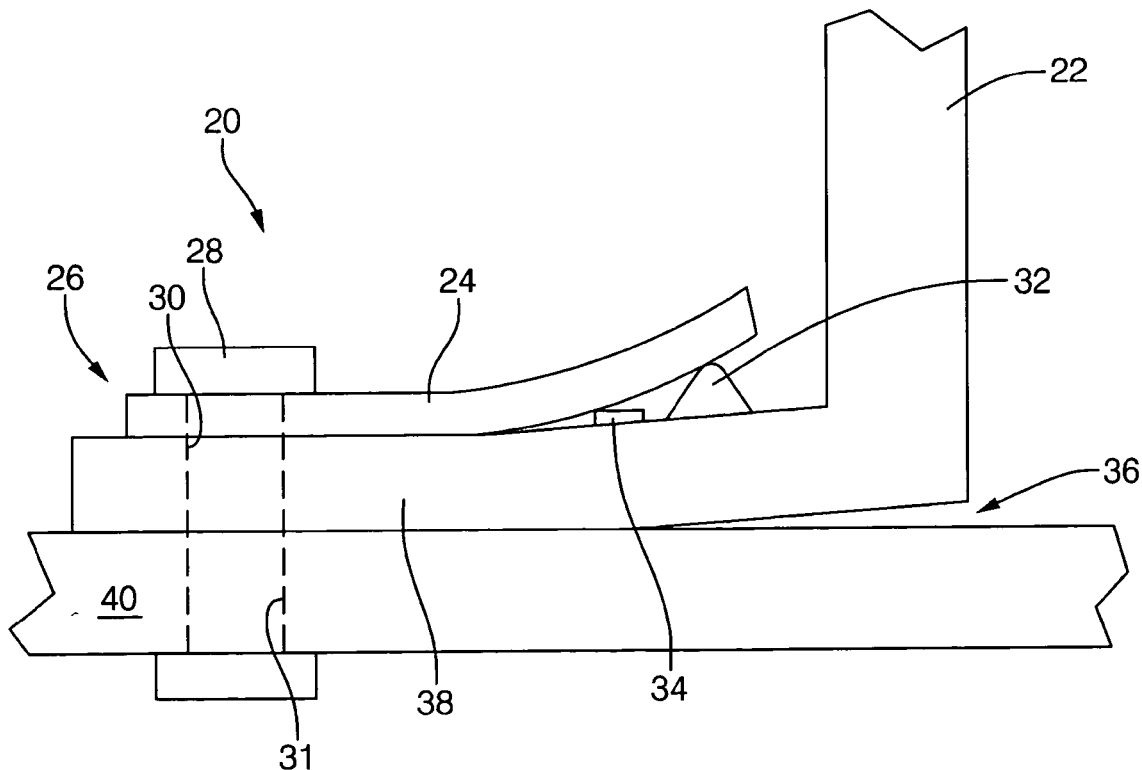
FIG. 2 is a cross-sectional view a weight sensor according to the present invention.
Figure 3:
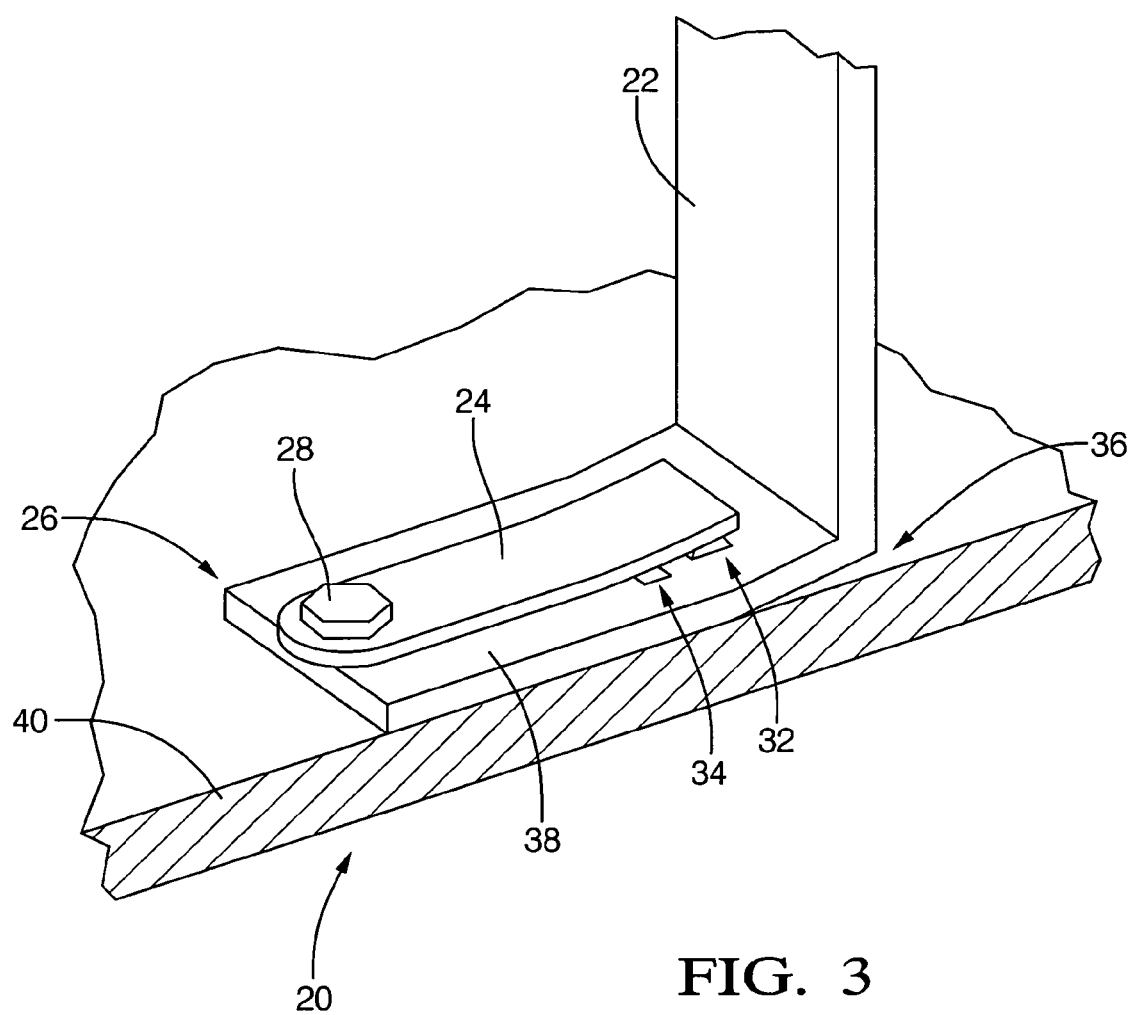
FIG. 3 is a perspective view of the weight sensor of FIG. 2.

Weight sensor 20 is shown in more particularity in FIGS. 2 and 3. Weight sensor 20 includes a plate member or cantilevered beam 24, fulcrum 32, and sensing device or strain gauge 34. Beam 24 has one fixed point of attachment, namely aperture 30, which is fastened by connector 26 to floor pan 40. Connector 26 includes nut 28 which extends through aperture 30 of beam 24 and aperture 31 of a seat frame foot 38. Cantilevered beam 24 also contacts fulcrum 32. Foot 38 extends from contact with floor pan 40 to leg 22, and defines a gap 36 between the bottom of foot 38 and the upper surface of floor pan 40. Beam 24 may be, in the exemplary embodiment, a wide washer made of a material capable of resiliently deflecting upon experiencing a load force. In addition, the material of beam 24 is capable of returning to its preload orientation after a load force is removed. The material of beam 24 may be any material having an elastic region of stress and strain in the range of expected occupant weight and which is relatively immune to work hardening. For example, certain types of polymers, composite materials, metal alloys, pre-hardened steel, ceramics, or other such materials may be used.

Figure 4:
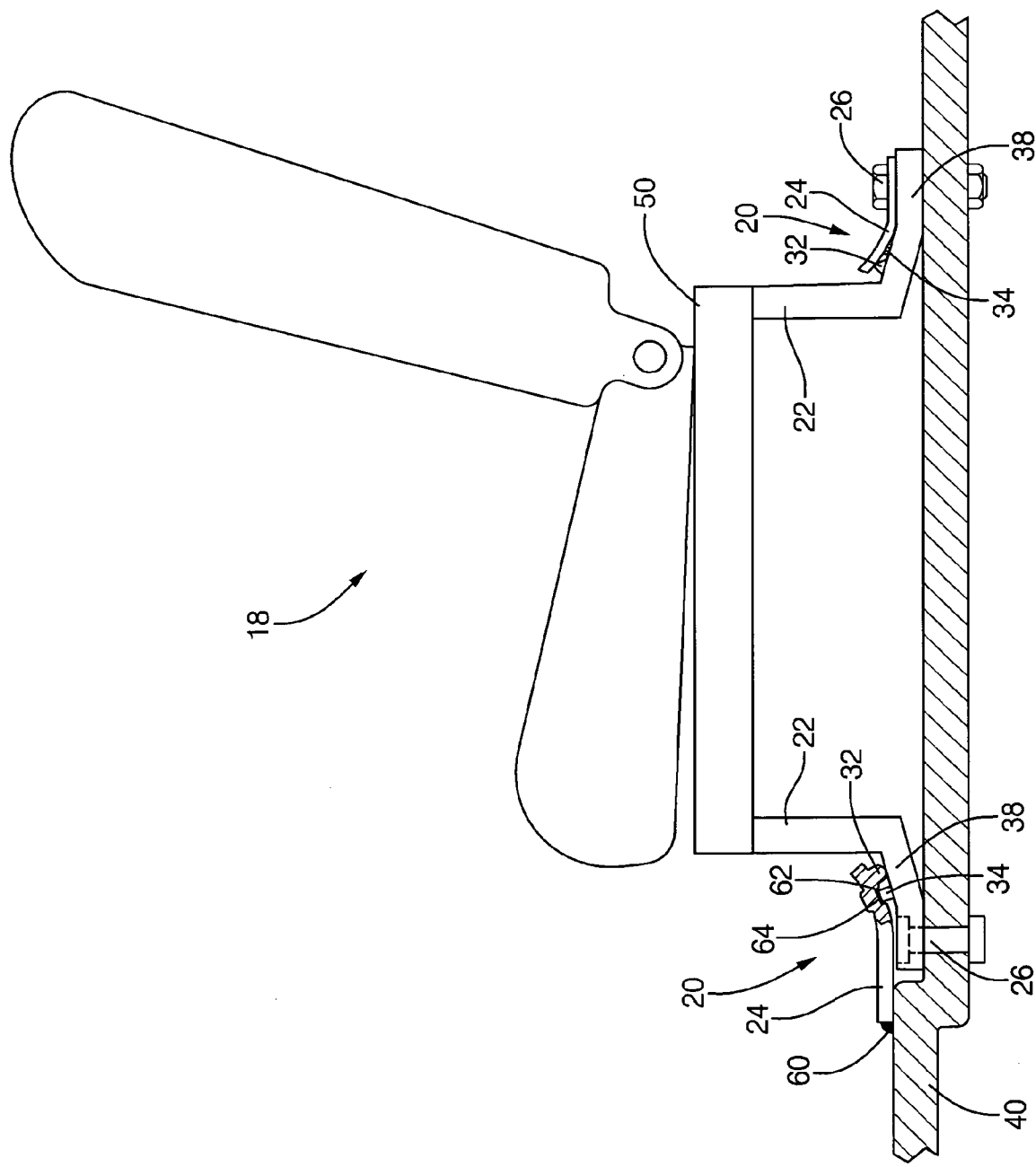
FIG. 4 is a side sectional view of the connection of the preferred and alternative weight sensor of FIG. 3 connected to a seat frame and floor plan in accordance with the present invention.

As shown in FIGS. 3 and 4, leg 22 is associated with a seat frame 50, so that when a vehicle occupant sits in a vehicle or car seat 18, leg 22 is pressed downwardly. As the amount of weight applied to leg 22 increases, foot 38 may resiliently deflect, causing beam 24 to also resiliently deflect between fulcrum 32 and connection 26. This resilient deflection will affect strain gauge 34, which provides a discernible signal that can translate to a known weight value, i.e., a weight value corresponding to an occupant of the vehicle seat.

In operation, strain gauge 34 is connected to control unit 14 and provides a signal representing the amount of resilient deflection of beam 24 that is interpreted to a corresponding weight value. Control unit 14 uses the input from strain gauge 34 and possibly other sensors (not shown) to characterize the occupant of car seat 18, for example whether the occupant is an adult or child. In the event of a collision, crash sensor 12 indicates the occurrence of a collision to control unit 14. Before control unit 14 activates air bag 16, control unit 14 determines the weight value from weight sensor 20 to ascertain whether or not deployment of air bag 16 is required, such as if an adult occupant of vehicle or car seat 18 is present. In some circumstances, i.e., where the weight on observed by weight sensor 20 that there was no adult present in vehicle seat 18, the appropriate action may be not to deploy air bag 16.

By creating gap 36 in the unloaded position, when a load is applied to the vehicle seat, a downward force is applied on leg 22. Alternatively, other mechanisms for providing flexibility, such as thinner materials, may be employed. This resiliency may be alternatively provided by a resilient member more complex than a simple plate, for example a serpentine ribbon, a perforated plate, or a bi—metallic strip to compensate for temperature, or a composite material with a local inhomogeneity in material properties for the purpose of providing the desired flexion at the desired location. This downward force causes foot 38 of leg 22 to flex downward. By flexing downward, fulcrum 32 is lowered, and the force on strain gauge 34 is reduced. In this way, the load on seat 18 is translated into a reduction in the strain below a baseline force, which is transferred by mechanical advantage into strain gauge 34 which senses the change. With this configuration, weight sensor 20 may be readily modified to fit existing seat frames and connection methods. Many seat connection points have very little lateral extent. In these cases, there is typically still some angle between the foot 38 of the seat frame leg 22 and floor pan, which allows a degree of flexing under an applied load. A washer having one end fixed in position and a second end disposed proximate a fulcrum, such as depicted as wide washer 24, may be inserted and oriented so that washer 24 protrudes slightly in the direction of the acute angle defined by foot 38 and floor pan 40.

Other seat connections include simple tab in slot designs (not shown). In this case, a washer may be inserted under the tab, so that the washer is pinned in place. A load applied to seat 18 increases the force on the tab, thus causing the reading of strain gauge 34 to increase. Strain gauge 34 provides an electrical signal which is easily coupled to a control for processing by a suitable algorithm. Further, a diagnostic system may be added to control unit 14. Alternatively, connection 26 may comprise a pin, a rivet, a tab, or another type of threaded fastener (not shown). Further, beam 24 may be directly or indirectly coupled to floor pan 40 by a well. In another embodiment, beam 24 may include an indentation serving as fulcrum 32 (not shown).

Upon installation of weight sensor 20, control unit 14 may be programmed so that the weight signal from strain gauge 34 is sensed as an initial baseline force value. Then, in operation, the signal observed by control unit 14 is compared to this baseline force value so that control unit 14 may determine whether the current weight is above or below the baseline force. Optionally, the signal provided to control unit 14 may have filtering circuitry applied to remove noise or transient signals, or an anti-aliasing filter may be employed to avoid sampling errors. The signal values observed by control unit 14 may also be stored in memory for use in later portions of the vehicle control, such as the ignition cycle.

While this invention has been described as having an exemplary design, the present invention may be further modified within the spirit and scope of this disclosure. For example, the weight sensor 20 associated with the first leg 22 is modified by inclusion of a weldment 60 directly interconnecting the cantilever beam 24 to the floor pan 40. Furthermore, an indentation 62 is formed in the free end of cantilever beam 24 for mountingly receiving the sensor device 34 via adhesive 64. This application is therefore intended to cover any variations, uses, or adaptations of the invention using its general principles. Further, this application is intended to cover such departures from the present disclosure as come within known or customary practice in the art to which this invention pertains.

What is claimed is:

1. A weight measuring sensor assembly for use in a vehicle having a vehicle seat capable of supporting a vehicle occupant, wherein the vehicle seat comprises a seat frame member attached to a vehicle floor pan, the seat frame member comprising a rigid portion and a resiliently flexible portion, the resiliently flexible portion able to resiliently deflect with respect to the vehicle floor pan upon experiencing a force due to the weight of the vehicle occupant, said sensor assembly comprising:

a plate member, said plate member comprising a fixed first end, a body portion, and a second end, wherein said body portion is capable of resiliently deflecting upon experiencing a load force, and said body portion is further capable of returning to a pre-load orientation after said load force is removed, wherein said second end is movable relative to said fixed first end of said plate member and disposed at an angle relative to the floor pan, and said fixed first end is oriented generally horizontal relative to the floor pan, said fixed first end opposing said second end, and said second end being operatively associated with a resiliently flexible portion of the seat frame;

a fulcrum located between said second end of said plate member and the resiliently flexible portion of the seat frame, said fulcrum structured and arranged to prevent said second end from entering the plane defined by said fixed first end and to apply load forces from said flexible portion of the seat frame to the second end of the plate member; and a sensing device connectively disposed between said body of said plate member and the resiliently flexible portion of the seat frame, at a point between said fixed first end of the plate member and said fulcrum, and adapted to provide a signal as a function of load force applied from the resiliently flexible portion of the seat frame to the plate member.

2. The weight measuring sensor assembly of claim 1, further comprising a fastener, wherein said fixed first end of said plate member comprises an opening adapted to receive said fastener to secure said fixed first end to the rigid portion of the seat frame member.

3. The weight measuring sensor assembly of claim 2, wherein said opening in said fixed first end of said plate member comprises one of a hole and a slot.

4. The weight measuring sensor assembly of claim 2, wherein said fastener comprises one of a pin, a rivet, a tab, and a threaded fastener.

5. The weight measuring sensor assembly of claim 1, wherein said fixed first end of said plate member is secured to one of said rigid portion of said seat frame member and said vehicle floor pan with a weld.

6. The weight measuring sensor assembly of claim 1, wherein said plate member further comprises an indentation within which said sensing device is mounted.

7. The weight measuring sensor assembly of claim 6, wherein said sensing device is adhesively mounted into said indentation.

8. The weight measuring sensor assembly of claim 1, wherein said fulcrum is integrally formed in said second end of said plate member.

9. The weight measuring sensor assembly of claim 1, wherein said sensing device is a strain gauge.

10. The weight measuring sensor assembly of claim 1, wherein said sensing device is adapted to sense said plate member being strained during attachment of said fixed first end and measure an initial "baseline" force.

11. The weight measuring sensor assembly of claim 10, wherein said sensing device is adapted to sense a load force applied to said vehicle seat frame less than said "baseline" force.

12. The weight measuring sensor assembly of claim 10, wherein said sensing device is adapted to sense a load force applied to said vehicle seat frame greater than said "baseline" force.

13. A weight measuring assembly for use in a vehicle having a seat capable of supporting a vehicle occupant, wherein the seat comprises a frame including a generally vertically disposed rigid leg portion and a generally horizontally disposed resilient foot portion integrally formed with said leg portion and extending, in cantilever fashion therefrom, a free end of said foot portion being rigidly grounded to a vehicle floor pan an opposed end of said foot portion supporting the leg portion in a spaced relationship above said floor pan, said sensor assembly comprising:

an elongated resilient plate member having one end rigidly grounded to said floor pan and extending generally parallel to said foot portion;

means defining a fulcrum disposed between said plate member and foot portion at a location distal said one end to effect a vertical displacement of an opposed end of said plate member, wherein vehicle occupant induced load forces will effect limited bending of said foot portion; and a sensing device connectively disposed between a generally centrally disposed location of said plate member and an adjacent surface of said foot portion, said sensing device adapted to generate a signal as a function of load force applied from the foot portion to the plate member.

14. The weight measuring sensor assembly of claim 13, wherein the free end of said foot portion and said one end of said plate member are commonly grounded to said floor pan by a single fastener means.

15. The weight measuring sensor assembly of claim 14, wherein said single fastener means comprises an elongated shank portion extending through registering apertures formed in said foot portion, plate member and floor pan.

* * * * *